(12) United States Patent
Yoshikawa (10) Patent No.: US 7,886,938 B2
(45) Date of Patent: Feb. 15, 2011

(54) POWDER AND GRANULAR MATERIAL FEEDER

(75) Inventor: Osamu Yoshikawa, Satsumasendai (JP)

(73) Assignee: Yoshikawa Corporation, Satsumasendai-shi, Kagoshima (JP)

( * ) Notice: Subject to any disclaimer, the term of this patent is extended or adjusted under 35 U.S.C. 154(b) by 591 days.

(21) Appl. No.: 11/996,639

(22) PCT Filed: Aug. 9, 2006

(86) PCT No.: PCT/JP2006/315742

§ 371 (c)(1),
(2), (4) Date: Jan. 24, 2008

(87) PCT Pub. No.: WO2007/020851

PCT Pub. Date: Feb. 22, 2007

(65) Prior Publication Data

US 2010/0176159 A1 Jul. 15, 2010

(30) Foreign Application Priority Data

Aug. 17, 2005 (JP) ............................. 2005-236766

(51) Int. Cl.
*B65G 65/48* (2006.01)
(52) U.S. Cl. ...................... 222/370; 222/168; 222/227; 222/238; 222/342; 222/345; 222/410
(58) Field of Classification Search ......... 222/167–172, 222/227, 236–239, 242, 342, 344–347, 367, 222/370, 410, 414
See application file for complete search history.

(56) References Cited

U.S. PATENT DOCUMENTS 3,266,677 A * 8/1966 Hamilton .................... 222/370
4,747,524 A * 5/1988 Krambrock ................. 222/636

FOREIGN PATENT DOCUMENTS

| JP | 58-27225 U | 2/1983 |
| JP | 59-71219 U | 5/1984 |
| JP | 6-47860 Y2 | 7/1994 |
| JP | 2002-2965 A | 1/2002 |

* cited by examiner

*Primary Examiner*—J. Casimer Jacyna
(74) *Attorney, Agent, or Firm*—Leydig, Voit & Mayer, Ltd.

(57) ABSTRACT

A powder and granular material feeder constantly feeding powder and granular material with poor fluidity that is discharged to an annular passage between inner and outer tubes through a clearance between a lower end of the inner tube and a bottom plate from a fall opening, outside of the feeder, by scraping plates immediately below the fall opening. The fall opening has an arcuate configuration starting on an outer side of the outer tube to the inner tube or to an inner side of the inner tube. The scraping plates are located on a small cylinder around the center of curvature. The scraping plates and spokes rotate in opposite directions from each other at a portion of the fall opening, and the powder and granular material transferred by the spokes and inward claws into the fall opening is discharged in a direction opposite to the feeding direction and leveled by an lower edge of the outer tube.

3 Claims, 7 Drawing Sheets

POWDER AND GRANULAR MATERIAL FEEDER

TECHNICAL FIELD

The present invention relates to a powder and granular material feeder for feeding a powder and granular material with poor fluidity in a quantitative manner.

BACKGROUND ART

In a conventional quantitative powder and granular material feeder, an inner tube for feeding a powder and granular material is provided on a bottom plate through an intermediation of a clearance, and a lower end of an outer tube sharing the same center line with the inner tube is connected to the bottom plate; an annular passage for the powder and granular material discharged through the clearance is formed between the inner and outer tubes, and a discharge port is provided in the passage; central rotary blades (spokes) are provided on an upright rotary member protruding from the central portion of the bottom plate; and an outer peripheral rotary ring is provided at distal ends of the spokes to extend along an inner peripheral surface of the outer tube, and a plurality of inward claws are provided on the rotary ring, the material being discharged in a quantitative manner through the discharge port (see, for example, Patent Documents 1 and 2).

For hygroscopic powder and granular materials (e.g., slaked lime and active carbon), there has been devised a means by which a rotor rotating on the still outer side of the discharge port and the passage is provided on a supporting plate, and a plurality of powder/granular material accommodating cutout boxes are formed at equal intervals in the outer peripheral portion of the rotor, the hygroscopic powder and granular material in the boxes being discharged by utilizing self-weight descent of a floating roller or a floating ball (see, e.g., Patent Document 3).

In a case of a powder and granular materials containing water and exhibiting poor fluidity (e.g., a material such as titanium oxide, powder dye, pigment, soda ash, zeolite, or toner; a food such as starch, amino acid, or flour; or dehydrated cake plaster of sludge, or fertilizer), the material cannot be accommodated in the cutout boxes situated directly below the discharge port of the passage to a sufficient degree due to the poor fluidity, so the quantitative feeding using the cutout boxes is conducted rather insufficiently; thus there is a demand for an improvement in this regard (see, e.g., Patent Document 3).

Patent Document 1: Japanese Utility Model Examined Publication No. Hei 06-47860 (Japanese Utility Model Application Laid-open No. Hei 03-130237)

Patent Document 2: JP 3139903 A (JP 07-187405 A)

Patent Document 3: JP 3401233 A (JP 2002-2965 A)

DISCLOSURE OF THE INVENTION

Problem to be Solved by the Invention

It is an object of the present invention to feed a powder and granular material with poor fluidity discharged from the clearance between the lower end of the inner tube and the bottom plate to the annular passage (space part between the inner and outer tubes) to the outside of the feeder from a fall opening of the space part in a quantitative manner by a scraping plate directly below the fall opening.

Means for Solving the Problems

In order to achieve the above-mentioned object, a powder and granular material feeder according to the present invention includes: a bottom plate; an outer tube provided upright on the bottom plate; an inner tube provided at an interval from an upper end portion of the outer tube and sharing a center line with the outer tube; an ascendable/descendable height adjusting tube providing a material passage clearance between a lower end of the inner tube and the bottom plate and allowing adjustment of a height of the clearance; a rotation shaft provided on the bottom plate to extend along the center line; a plurality of spokes provided on the rotation shaft; a ring provided at distal ends of the plurality of spokes so as to extend along an inner peripheral surface of the outer tube; a plurality of inward claws provided on the ring and between the spokes; and a fall opening formed in the bottom plate and open to a space part formed between the inner tube and the outer tube. Further, the powder and granular material feeder includes a small cylinder including a center corresponding to a center of curvature of an arcuate configuration of the fall opening whose both ends reach the inner tube or an inner side of the inner tube from an outer side of the outer tube and an upper end connected to the bottom plate, a rotor sharing a center line with the small cylinder, a scraping plate provided on the rotor, in which: the scraping plate and the spokes rotate in opposite directions to each other at a portion of the fall opening; and a powder and granular material transferred into the fail opening from the bottom plate facing the space part by the spokes and the inward claws is discharged in a direction opposite to the direction of the transfer by the scraping plate while leveled off by a lower edge of the outer tube.

Effect of the Invention

According to the present invention, it is possible to feed powder and granular material with poor fluidity, which is discharged from the clearance between the lower end of the inner tube and the bottom plate to the space part between the inner and outer tubes, to the outside of the feeder from the fall opening of the space part in a quantitative manner by a scraping plate directly below the fall opening.

BEST MODE FOR CARRYING OUT THE INVENTION

At the upper end of a upright cylindrical outer tube 2 provided upright on a horizontal bottom plate 1, there is provided a donut-shaped horizontal disc 2' of the same outer diameter, and a cylindrical inner tube 3 fixedly in the inner periphery of the disc 2' so as to share a center line C with the outer tube 2.

Between the lower end 3" of the inner tube 3 and the bottom plate 1, there is provided a clearance T through which the material passes; the height of the clearance T is adjusted so as to allow ascent and descent by means of a well-known height adjusting tube 3' (Patent Document 1 (Japanese Utility Model Publication No. 06-47860)).

Figure 3:
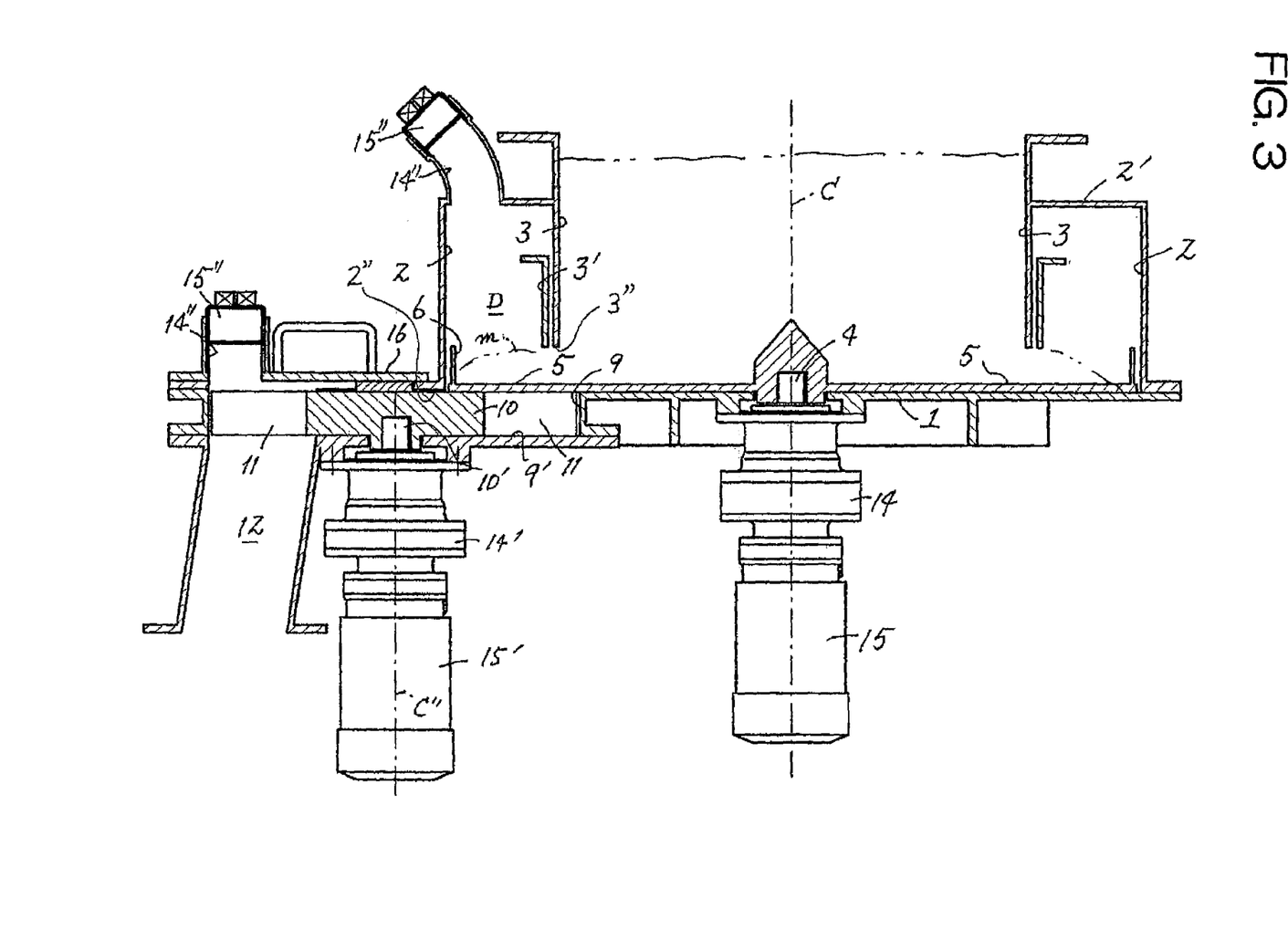
FIG. 3 is a longitudinal sectional view of a powder and granular material feeder according to the present invention.
Figure 4:
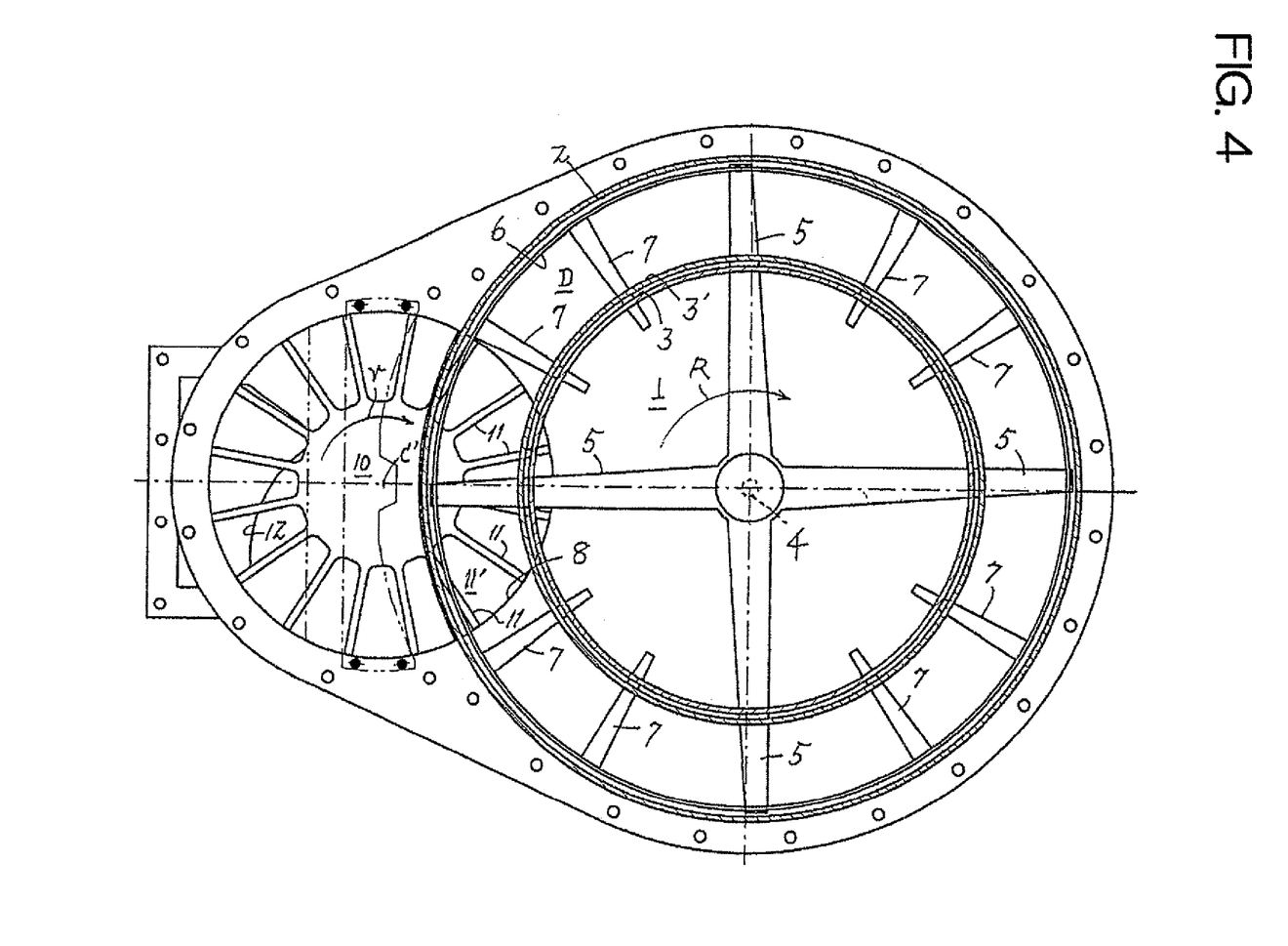
FIG. 4 is a plan view of FIG. 3.
Figure 5:
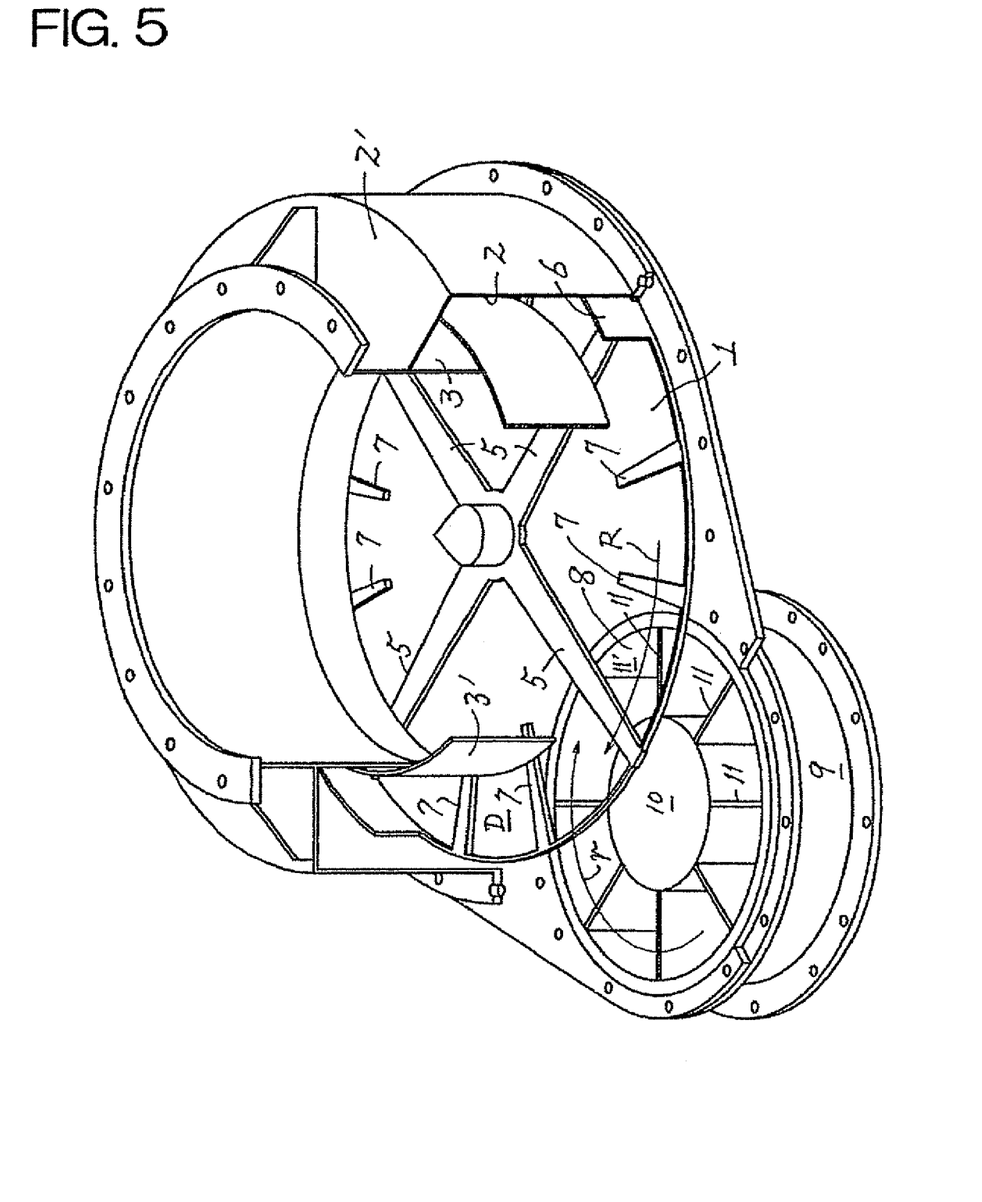
FIG. 5 is a partially cutaway perspective view of FIG. 4.

In the center line C of the bottom plate 1, there is provided an erect rotation shaft 4, and a plurality of (four) spokes 5, 5, 5, 5 of the same length are provided on the shaft 4 at the same opening angle so as to be in contact with the bottom plate 1; at the outer ends thereof, there is provided a ring 6 extending along the inner peripheral surface of the outer tube 2 (FIGS. 3 and 4).

On the inner surface of the ring 6, there are provided at equal intervals, between the spokes 5, a plurality of (two, in FIGS. 1 and 3) inward claws 7, 7 so as to be in contact with the bottom plate 1; their distal ends reach the inner tube 3 via a space part D between the inner tube 2 and the outer tube 3 or extend to the inner side of the inner tube 3.

Between the inner and outer tubes 2, 3, there is formed the space part D by the donut-shaped horizontal disc 2', and an annular passage for a material m discharged through the material passage clearance T is formed by the space part D; the material m to be discharged moves within the space part D in an annular manner by being pushed through rotation around the center line C of the spokes 5 and the inward claws 7 in contact with portion of the bottom plate 1 under the clearance portion T.

Further, a fall opening 8 is open in the portion of the bottom plate 1 in the space part D, whereby the material feeder is completed.

As shown in FIGS. 1, 4, 5, and 7, the fall opening 8 is formed in an arcuate configuration whose both ends reach the inner tube 3 or the inner side of the inner tube 3 from the outer side of the outer tube 2, and the upper end of a small cylinder 9 whose center is at the center of curvature C' of the arcuate configuration is connected to the bottom plate 1.

Figure 1:
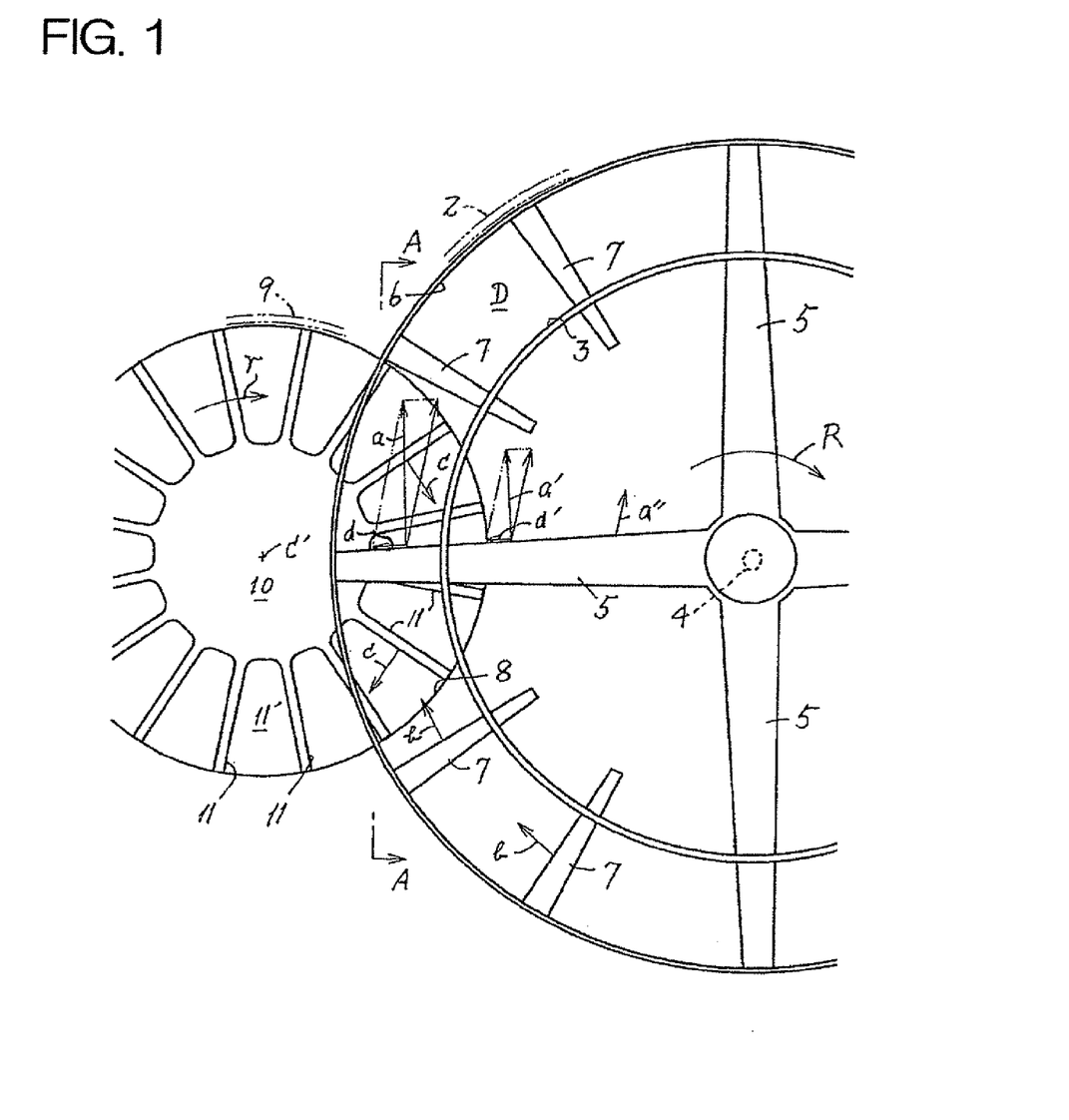
FIG. 1 is an explanatory plan view illustrating the working state of the present invention in vectors.

The small cylinder 9 is closed by a lower endplate 9', and its depth is substantially the same as the height of the clearance T fully open; at the center of the lower end plate 9', there is provided a rotor 10 sharing the center line C" at the center of the lower end plate 9', and the rotor 10 is provided with scraping plates 11. Further, in order that the rotating direction of the scraping plates 11 may be reverse to the rotating direction of the spokes 5, the ring 6, and the inward claws 7 at the fall opening 8, the rotation shaft 4 and the rotor 10 are rotated in the same directions R, r around the center lines C, C", respectively (FIG. 1).

Figure 6:
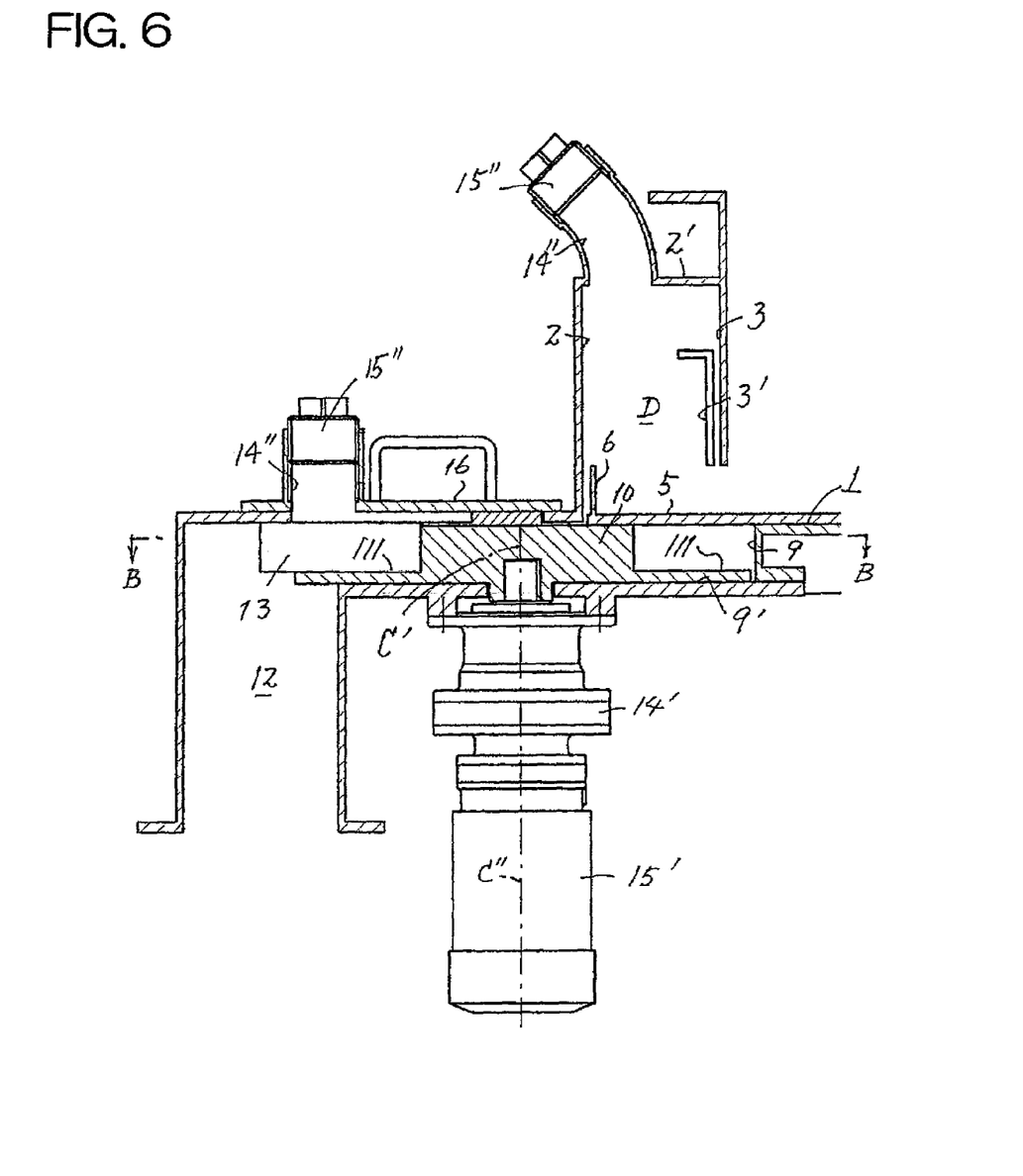
FIG. 6 is a longitudinal sectional view of an example of a scraping plate.
Figure 7:
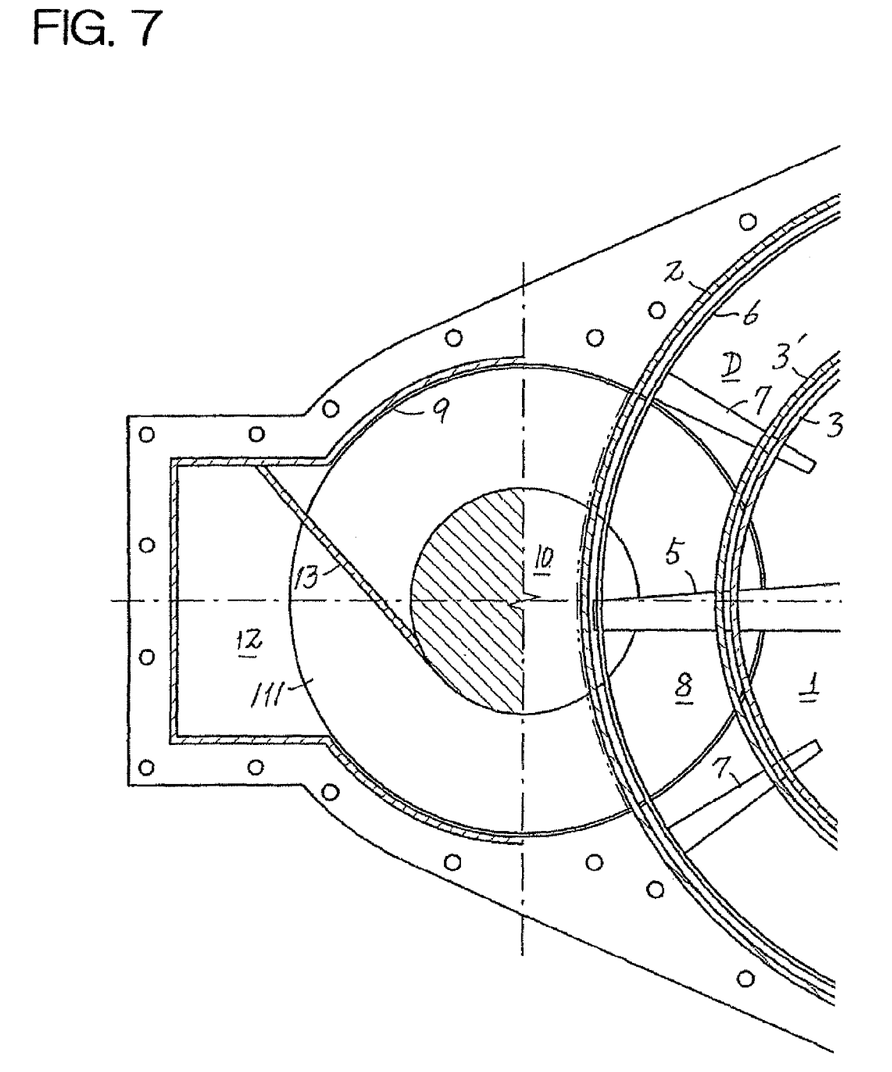
FIG. 7 is a plan view as seen in the direction of the arrow line B-B of FIG. 6.

Thus, the powder and granular material m pushed and transferred to a position directly above the fall opening 8 from the portion of the bottom plate 1 in the space part D by the spokes 5 and the inward claws 7 is transferred in the direction reverse to the above-mentioned transfer direction (direction of transfer by spokes 5 and inward claws 7) by the scraping plates 11; the powder and granular material in, whose upper surface is leveled off by the lower edge 2" of the outer tube 2, rotates on the outer side of the outer tube 2 to be discharged to the outside of the feeder via a discharge port 12 formed in the lower end plate 9' or in the small cylinder 9 (FIG. 3 or 4). As shown in FIGS. 6 and 7, a discharge guide plate 13 is provided.

As shown in FIGS. 1, 2, 3, and 4, the scraping plates 11 are formed by a plurality of radial plates provided at equal intervals in the outer periphery of the rotor on the lower end plate 9' of the small cylinder 9; between the scraping plates 11, 11, there are formed scraping boxes 11'.

Further, as shown in FIGS. 6 and 7 as a modification, it is also possible to provide on the lower end plate 9' a rotary disc type scraping plate 111 provided horizontally at the lower end of the outer periphery of the rotor 10; in this case, the above-mentioned discharge guide plate 13 is provided.

As shown in FIG. 3, drive motors 15, 15' constituted by inverter motors are respectively provided on the erect rotation shaft 4 in the central line C of the bottom plate 1 and on the rotation shaft 10' of the rotor 10 through the intermediation of reduction gears 14, 14', and the respective rotating directions R, r of the motors 15, 15' are the same.

As shown in FIG. 1, through rotation of the spokes 5, a resultant vector a and a vector b due to the inward claws 7 are applied to the powder and granular material m, and a vector c due to the reverse rotation of the scraping plates 11 is applied thereto in an opposite direction; directly above the fall opening 8 of the space part D, the normal direction vectors a, b and the reverse direction vector c cross each other.

The normal direction vector a due to the spokes 5 is larger than the vector b due to the inward claws 7 (a>b); an outward vector d is applied along the spokes 5, and the powder and granular material m directly above the fall opening 8 is agitated in the normal and reverse directions.

Figure 2:
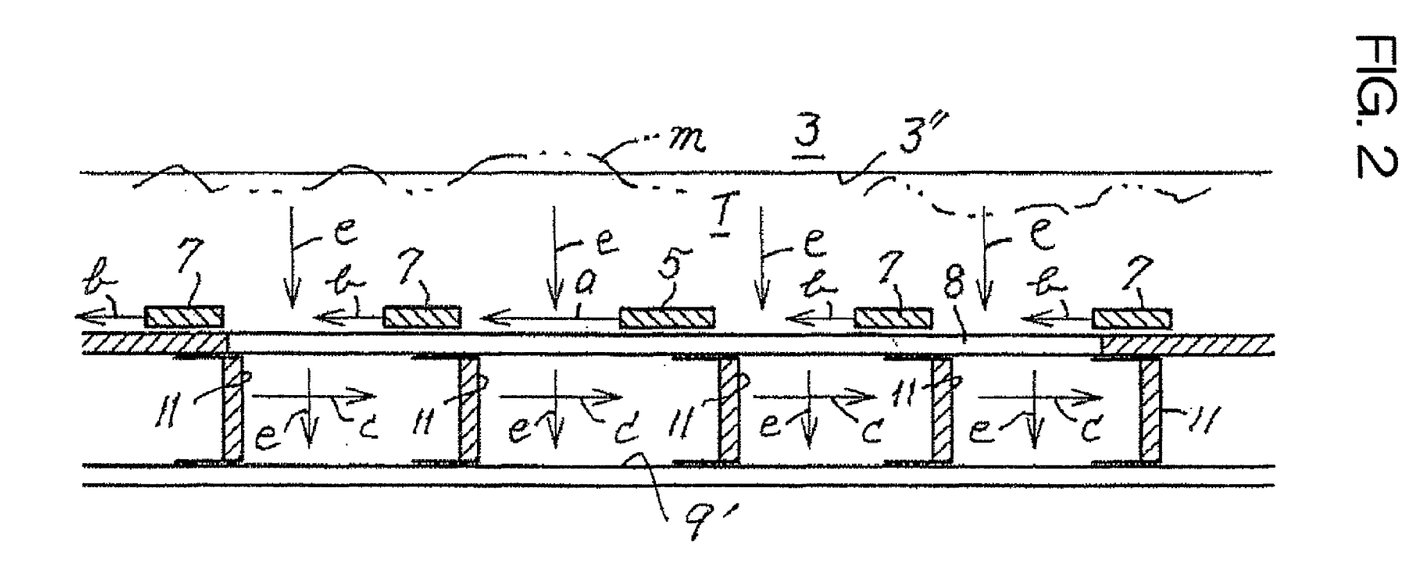
FIG. 2 is an explanatory front view illustrating the working state in the fall opening portion in vectors.

As shown in FIG. 2, the material m discharged from the discharge clearance T at the lower end of the inner tube 3 to the space part D falls into the fall opening 8, to generate a downward vector e which also crosses the reverse vector c due to the scraping plates 11, so, within the fall opening 8, the powder and granular material is agitated in the vertical directions.

As described above, the agitation in the normal and reverse directions and in the vertical directions is effected in the range from above the fall opening 8 to the interior thereof; the agitation is effected to a maximum degree around the rotating spokes 5. Through the normal and reverse (horizontal) agitation and the raising and lowering (vertical) agitation, fluidity is imparted to the powder and granular material m on the upper and lower sides of the fall opening 8. The powder and granular material m rotates to the outside of the outer tube 2 by the scraping plates 11 from the fall opening 8 and from the space part D while leveled off by the lower edge 2" of the outer tube 2, and is quantitatively discharged to the outside of the feeder from the cutout discharge port 12 of the lower end plate 9' or via the guide plate 13 (FIGS. 6 and 7).

The rotating speeds of the spokes 5, the inward claws 7, and the scraping plates 11 are adjusted as appropriate by the motors 15, 15' constituted by inverter motors. It is possible to feed the material smoothly to the outside of the feeder in a quantitative manner while maintaining a fixed discharge amount per unit time.

In FIGS. 3 and 6, reference numeral 14" indicates ventilation holes, reference numeral 15" indicates opening/closing plugs, and reference numeral 16 indicates a cover for the rotor 10 and the scraping plates 11.

As described above, in the powder and granular material feeder of the present invention, the spokes 5, the ring 6, and the inward claws 7 are rotated around the common center line C. When the interior of the inner tube 3 is filled with the material m, the material is discharged on a first-in/first-out basis through the clearance T into the space part D, and is pushed by the forward end portions of the spokes 5 and the inward claws 7 to be rotated in an annular fashion along the space part D before downwardly entering the small cylinder 9 through the arcuate fall opening 8.

At the time of downward entering, the material is pushed by the scraping plates 11 directly below the fall opening 8 in a direction opposite to the rotating direction of the spokes 5 and the inward claws 7, so a shearing force is generated between the portion of the bottom plate 1 in the space part D and the descending material, whereby the descending material downwardly enters the portion directly below the fall opening 8 from the space part D, and is conveyed to the outside of the outer tube 2 by the scraping plates 11 while leveled off by the lower edge 2″ of the outer tube 2 before being downwardly fed in a quantitative manner from the fall opening 8.

The vector of the powder and granular material pushed horizontally directly above the fall opening 8 by the outer end portions of the spokes 5 and the vector of the material pushed by the scraping plates 11 in the outer periphery of the rotor 10 cross each other, with the result that the horizontal and vertical agitation of the material is effected to a maximum degree in this portion. The vector of the powder and granular material horizontally pushed by the inward claws 7 and the vector of the material pushed by the scraping plates 11 in the outer periphery of the rotor 10 also cross each other to agitate the material horizontally and vertically. Immediately below and immediately above the fall opening 8 of the portion of the bottom plate 1 in the space part D, agitation swelling in the portion where the spokes 5 pass occurs to a large degree, and agitation swelling also occurs in the portion where the inward claws 7 pass, with the powder and granular material with poor fluidity being conveyed outwards for quantitative feeding while leveled off to a sufficient degree by the scraping plates 11.

The invention claimed is:

1. A powder and granular material feeder, comprising:
   a bottom plate;
   an outer tube located upright on the bottom plate;
   an inner tube spaced from an upper end portion of the outer tube and sharing a center line with the outer tube;
   an ascendable/descendable height adjusting tube defining a material passage clearance between a lower end of the inner tube and the bottom plate for adjusting height of the clearance;
   a rotation shaft located on the bottom plate and extending along the center line;
   a plurality of spokes located on the rotation shaft;
   a ring located at distal ends of the plurality of spokes and extending along an inner peripheral surface of the outer tube;
   a plurality of inward claws located on the ring and between the spokes;
   a fall opening in the bottom plate and open to a space between the inner tube and the outer tube and having an arcuate configuration;
   a small cylinder comprising
      a center corresponding to a center of curvature of the fall opening, having an arcuate configuration
      ends reaching the inner tube or an inner side of the inner tube from an outer side of the outer tube, and
      an upper end connected to the bottom plate;
   a rotor sharing a center line with the small cylinder;
   a scraping plate located on the rotor, wherein
      the scraping plate and the spokes rotate in opposite directions from each other at a portion of the fall opening, and
      powder and granular material discharged from a discharge clearance at the lower end of the inner tube into the space and transferred into the fall opening from the bottom plate facing the spaced by the spokes and the inward claws is discharged in a direction opposite to the direction of transfer by the scraping plate while being leveled by a lower edge of the outer tube;
   an annular horizontal disk above the fall opening; and
   a cover on a discharge port in the small cylinder or in a lower end plate of the small cylinder, wherein both the annular horizontal disk and the cover include a ventilation hole and a plug for the ventilation hole.

2. The powder and granular material feeder according to claim 1, wherein
   the rotor is located on the lower end plate of the small cylinder,
   a plurality of scraping plates are located at an outer periphery of the rotor, and
   a plurality of leveling-off boxes are provided by the plurality of scraping plates.

3. The powder and granular material feeder according to claim 1, wherein
   the rotor is located on the lower end plate of the small cylinder, and
   a disc-shaped scraping plate is located at a lower end of the outer periphery of the rotor.

* * * * *